United States Patent [19]

Norman et al.

[11] 4,314,982
[45] Feb. 9, 1982

[54] CATALYTIC DECOMPOSITION OF $H_2SO_4$

[75] Inventors: John H. Norman, La Jolla; David G. Williamson, San Luis Obispo, both of Calif.

[73] Assignee: General Atomic Company, San Diego, Calif.

[21] Appl. No.: 50,764

[22] Filed: Jun. 21, 1979

[51] Int. Cl.³ .................. C01B 17/48; C01B 3/02; C01B 17/52; C01B 17/90
[52] U.S. Cl. .................. 423/539; 423/531; 423/540; 423/542; 423/648 R
[58] Field of Search .................. 423/522, 533–538, 423/539, 540, 579, 648

[56] References Cited

U.S. PATENT DOCUMENTS

| | | | |
|---|---|---|---|
| 1,914,458 | 6/1933 | Perry | 423/537 |
| 2,005,412 | 6/1935 | Connolly et al. | 423/534 |
| 2,281,762 | 5/1942 | Grace | 423/522 |
| 3,005,687 | 10/1961 | Udy | 423/522 |
| 3,888,750 | 6/1975 | Brecher et al. | 423/539 |
| 4,089,940 | 5/1978 | Norman et al. | 423/539 |
| 4,158,048 | 6/1979 | Leclercq | 423/533 |

*Primary Examiner*—O. R. Vertiz
*Assistant Examiner*—Gary P. Straub

[57] ABSTRACT

A two-stage process for the catalytic decomposition of $H_2SO_4$ wherein $H_2SO_4$ in vapor form is contacted in a first stage with a platinum group metal catalyst at temperatures between about 700° K. and 970° K. The platinum group metal catalyst is supported on a substrate of titania, barium sulfate, zirconia, silica, zirconium silicate or a mixture thereof, and at least about 40 percent of the $H_2SO_4$ is decomposed to $SO_2$. Vapors from the first stage enter a second stage where they contact a copper oxide and iron oxide catalyst at a temperature above 970° K. The second stage catalyst is supported on a substrate of barium sulfate, zirconium oxide or titanium oxide.

11 Claims, No Drawings

CATALYTIC DECOMPOSITION OF $H_2SO_4$

The present invention relates to the decomposition of sulfuric acid, and more particularly to a process for catalytically decomposing sulfuric acid to obtain sulfur dioxide therefrom.

BACKGROUND OF THE INVENTION

Various thermochemical processes have been proposed for producing hydrogen from water and create oxygen as a by-product. These thermochemical reactions have particular interest because of their potential use in connection with nuclear reactors and solar collectors which produce large quantities of fairly high-temperature heat. One such "water-splitting" process produces hydrogen iodide and sulfuric acid as a part of a closed-cycle chain of reactions and is disclosed in U.S. Pat. No. 4,089,940, issued May 16, 1978 to John H. Norman et al. This process is based upon the Bunsen equation whereby sulfur dioxide, water and iodine are reacted to produce sulfuric acid and hydrogen iodide. After the hydrogen iodide and the sulfuric acid are separated from the reaction mixture, the hydrogen iodide is decomposed to produce gaseous hydrogen and to recover iodine, which is returned to the main reaction. The sulfuric acid is decomposed to produce oxygen and to obtain sulfur dioxide and water which are returned to the main reaction.

DISCUSSION OF THE PRIOR ART

It is disclosed in the above-identified U.S. patent that sulfuric acid in vapor form can be catalytically decomposed at temperatures between about 400° C. and about 950° C. and that, for example, a platinum catalyst might be used at a temperature of about 750° C. U.S. Pat. No. 3,888,750, issued June 10, 1975 to Brecher et al discloses that sulfuric acid, in vapor form, can be decomposed in contact with a vanadium catalyst. U.S. Pat. No. 2,406,930, issued Sept. 3, 1946 to Titlestad, teaches that sulfuric acid can be thermally decomposed at very high temperatures.

To provide a relatively large amount of surface area for the catalytic reaction to take place, platinum is normally distributed upon a porous carrier as a "supported catalyst". The employment of supported platinum catalysts at high temperatures in such a decomposition reaction has not been totally satisfactory because of the expense of platinum, and because catalyst supports have not exhibited sufficient inertness in the sulfuric acid vapor environment at the temperature range of most interest. Moreover, such catalysis has generally required large quantities of very high temperature heat, which has been a distinct economic disadvantage. Thus, there is room for considerable improvement in sulfuric acid decomposition catalysis using supported catalysts.

BRIEF SUMMARY OF THE INVENTION

It has been found that a platinum group metal can be employed as a supported catalyst to effectively decompose $H_2SO_4$ beginning at a relatively low temperature, i.e., about 700° K., when it is supported on a substrate that will retain its inertness and structural integrity under such conditions. Barium sulfate, zirconia, titania, silica, zirconium silicate and mixtures thereof have proved to be effective substrates.

Moreover, a particularly efficient decomposition process which can utilize available low-temperature heat is provided when the aforementioned platinum group metal supported catalyst is employed during the lower temperature, heat-up of the sulfuric acid vapor and a less expensive supported catalyst is employed as a second-stage of the process when higher temperatures are reached. Copper oxide and iron oxide are effective as supported catalysts in decomposing sulfuric acid at a temperature of about 1000° K. and above. At these temperatures, various substrates can be used including barium sulfate, zirconia, titania and others. Such "two-stage" decomposition is particularly adaptable to a continuous process wherein the sulfuric acid vapors are gradually heated by passage through two sequential beds of hot catalyst, reaching an initial decomposition temperature in the first stage, where relatively low quality heat can be made avail of, and thereafter requiring a lesser amount of higher temperature heat in the second stage of the process. Additional "stages" might be used so long as the decomposition essentially follows equilibrium concentrations during heat-up so as to preserve overall efficiency.

DETAILED DESCRIPTION OF THE PREFERRED EMBODIMENTS

By being able to effect a certain portion of the endothermic catalytic cracking of sulfuric acid vapors at a relatively low temperature, i.e., beginning at about 700° K. (1atm. total pressure), efficient advantage is obtained by utilizing relatively low quality heat. Further advantage is gained by continuing catalytic cracking during the time when the vapor is being raised to a higher temperature, e.g., above about 970° to 1000° K. where relatively high quality heat is required. Thus, heat for the endothermic reaction is supplied over the entire range of 700° K. to about 1150° K. The platinum group metals, particularly platinum itself, are effective catalytically at temperatures throughout the entire 700°–1150° K. range.

The platinum group metal catalyst is preferably employed as a supported catalyst, and the particular support must be able to continue to function when subjected to the sulfuric acid vapor atmosphere at the particular temperature range. It is of course important that the catalyst, as well, be capable of retaining its catalytic effectiveness in the corrosive sulfuric acid vapor environment. The platinum group metals are inert to such an environment at temperatures between 700° and 1150° K. and exhibit very good catalytic properties for this decomposition reaction. In addition, these metals can be physically dispersed upon a porous substrate to provide a large surface area to unit weight ratio and will physically retain this dispersed form at temperatures up to about 1000° K. At higher temperatures, supported catalysts of platinum group metals may not retain the desirable surface area to weight ratio in such an environment.

It has been found that a number of the usual oxide support materials, such as alumina, employed in catalyst systems do not exhibit a commercially practical life between about 700° K. and about 970° K. in this environment and thus are not considered suitable. Moreover, operation at the lower end of this temperature range is often particularly detrimental. However, it has been found that titania and a mixture of barium sulfate and titania are two substrates which exhibit particularly good longevity and effectiveness when employed as a substrate for a platinum group metal, supported catalyst system at temperatures even as low as 700° K. or below in the H₂SO₄ decomposition process. Other substrates which may be used include zirconia, silica and zirconium silicate. BaSO₄ alone provides an adequate substrate; however, a mixture of BaSO₄ with between about 2 w/o and 30 w/o TiO₂ (based upon total substrate weight) provides a substrate that exhibits excellent longevity and increased durability.

Inasmuch as maximizing the surface area is important in a catalytic reaction such as this, the platinum group metal is preferably dispersed upon the substrate in an amount less than about 2 w/o (weight percent) and preferably the metal is employed in an amount between about 0.1 and 1.0 weight percent, based upon weight of the substrate material. At a level of about 0.5 w/o, platinum would be present at a surface area/weight ratio of at least about 10 sq. m./gram of platinum.

Although the low-temperature stage of the decomposition process can be carried out separately, it is preferably performed as a first step in a continuous reaction process in conjunction with a "second-stage" higher temperature step, as described hereinafter, which continues heating to some desired upper temperature limit.

Preferably, the second stage treatment begins at a temperature between about 970° K. and 1000° K., and although the upper limit is governed only by the desired percentage decomposition of SO₃ it is not contemplated that temperatures above 1300° K. would be used and that it is likely the upper limit may be about 1150° K. It has been found that copper oxide and iron oxide, particularly CuO and Fe₂O₃, exhibit excellent catalytic activity and longevity in a sulfuric acid vapor environment at such high temperatures. This high-temperature catalyst is also employed as a supported catalyst, and there are a number of porous, inert materials which can be employed as substrates and which will maintain their inertness in such an atmosphere at such a temperature, e.g., between about 970° K. and about 1150° K. These substrates include barium sulfate, zirconia, titania, silica and alumina. The less expensive copper oxide and iron oxide catalysts can be employed in higher relative amounts on the supporting substrates, and they might be used in an amount up to about 25 weight percent. Preferably, the copper oxide and iron oxide catalytic materials are employed in an amount of between about 5 and about 10 weight percent, based upon the weight of the substrate.

As earlier indicated, with respect to the low temperature stage, the higher temperature stage might also be separately employed; however, the real advantage lies in being able to supply heat over a range of temperatures so that full advantage is taken of a heat source, such as a nuclear reactor, as a part of a continuous process. In this respect, the supported catalyst can be employed as a part of a static bed or possibly a dynamic bed, e.g., a fluidized bed. The sulfuric acid vapor is passed through the bed which is maintained with a desired temperature gradient throughout one of the aforementioned temperature ranges. Preferably, the first stage bed has a temperature gradient of at least about 100° K., and the overall bed has a temperature gradient of at least about 300° K. By the time the H₂SO₄ vapor initially reaches, for example, about 800° K., the major portion of it, i.e., about 97 percent (at 1atm.), has already dissociated to H₂O and SO₃, and cracking of the SO₃ to SO₂ and O₂ has begun and is continuing as the vapor passes through the bed and gradually increases in temperature.

The contact time between the sulfuric acid vapor and the heated catalyst bed in the first stage is such that decomposition of at least about 40 percent of the SO₃ occurs. Preferably, the flow rate of the vapor stream is adjusted so that decomposition reasonably closely follows the theoretical equilibrium conditions for increasing temperature, and preferably between about 40 and about 60 percent of the original sulfuric acid vapor has been decomposed to SO₂ by the time the stream exits from the first low-temperature stage of the process. As earlier indicated, the initial dissociation is to a mixture of SO₃ and H₂O, which is followed by the catalytic-assisted breakdown of SO₃ to SO₂ plus O₂. The catalysts described are capable of achieving decomposition to SO₂ equal to about 95% of equilibrium value within a residence time of not longer than 5 seconds.

The vapor stream containing the undecomposed sulfuric acid and the decomposition products exiting from the first stage bed is channeled into the second stage bed where the supported copper oxide or iron oxide catalyst effects further decomposition of the sulfuric acid. Some further decomposition to H₂O and SO₃ and of the minor portion of H₂SO₄ remaining is accompanied by further breakdown to sulfur dioxide and oxygen. The overall process aporoaches equilibrium conditions at the selected final temperature as closely as feasible without unduly increasing bed size (and thereby increasing residence time). Preferably, by the time the vapor stream exits from the second stage bed, at least about 70 percent of the original sulfuric acid vapor has been broken down to SO₂.

The gases are then heat-exchange cooled in the absence of any catalyst to both preserve the SO₂ and to recover the sensible heat. Separation of the components is then carried out, with undecomposed sulfuric acid and SO₃ eventually being returned to the entering stream for another pass through the two-stage catalyst bed. The effectiveness of the aforementioned catalysts are such that if the low-temperature stage is operated between about 700° K. and 970° K. and the high-temperature stage at between about 970° K. and about 1150° K., conversion of about 85 percent of the incoming H₂SO₄ to SO₂ can be achieved at residence times, respectively, of 1.0 sec. and 0.5 sec., plus or minus 50 percent. The combination of catalysts used for the multistage process are capable of carrying out decomposition to SO₂ equal to at least about 95% of the equilibrium value for the ultimate temperature at a residence time of not more than 7 seconds total.

The following Examples illustrate the best modes presently contemplated by the inventors for carrying out the invention; however, these Examples are primarily illustrative and should not be considered to constitute limitations upon the scope of the invention which is defined solely by the appended claims.

EXAMPLE I

A suitable substrate is formed by mixing 45 grams of titanium dioxide with 25 milliliters of a one weight percent aqueous solution of polyvinyl alcohol. The resulting paste is extruded and dried for one hour at 110° C., and it is broken up into particles having a size less than about 5 mm. before being fired in air for three hours at 950° C. The fired titania is soaked in an aqueous solution of 0.2 Molar H₃Pt(SO₃)₂ OH (platinum acid sulfite) for about three hours. Afterwards, the titania is drained, heated to 125° C. for two days, thereafter again soaked in the same platinum acid sulfite solution and finally heated for about 1½ hours at 200° C. Neutron activation analysis shows that the resultant supported catalyst contains about 0.55 weight percent platinum, based upon weight of the titania substrate.

Testing of the catalyst in the temperature range of 700° K. to 970° K. shows that an equilibrium product distribution is established within about 0.6 second residence time at a temperature of 800° K., and the catalyst is considered very effective. The catalyst also retains its effectiveness and efficiency in the $H_2SO_4$ atmosphere within this temperature range and appears to be substantially physically unaffected by exposure to it.

EXAMPLE II

Titanium dioxide is employed as a sintering aid in the preparation of a barium sulfate support for a catalyst. 1.3 grams of titania powder is added to an aqueous solution of 50 grams of $Ba(OH)_2.8H_2O$ in 100 ml. of water at 348° K. Ten milliliters of 1 weight percent PVA in water are added, and then a sufficient amount of 50 weight percent sulfuric acid is added to totally precipitate the barium as barium sulfate. Excess water is removed, and the resulting paste is extruded and dried at about 400° K. for three hours after being broken into pieces having a maximum size of about 5 mm. Thereafter, firing is carried out for about two days at 1200° K.

Twenty-four grams of the substrate material is placed into a platinum acid aqueous solution, and after two hours the material is removed and drained. After washing with water and drying, the catalyst is fired at 1030° K. Testing of the catalyst by neutron activation analysis shows that it contains about 0.07 weight percent platinum, based upon weight of the substrate. Testing shows that the catalyst has substantially the same activity as the catalyst prepared in Example I and that an equilibrium product distribution is obtained at a residence time of about 0.6 sec. at 800° K. The catalyst maintains its activity and physical form after exposure to sulfuric acid vapors for long periods at temperatures as high as 1000° K.

EXAMPLE III

Approximately 15 grams of titania support material prepared in accordance with Example I is immersed in an aqueous solution containing 30 grams of $CuSO_4.5-H_2O$ in about 100 milliliters of water. The mixture is heated to boiling and then cooled to room temperature. The catalyst-carrying titania particles are drained and then dried overnight at 125° C. The supported catalyst is then placed in a reaction vessel and heated to about 1050° K. in the presence of sulfuric acid vapors for about ½ hour. At this temperature, copper sulfate decomposes to CuO, and measurement shows that approximately 10 weight percent of copper oxide is present, based upon the weight of the substrate. Testing of the catalyst in the presence of sulfuric acid vapors at temperatures between 1110° K. and about 1150° K. shows that it exhibits very good catalytic activity and is effective in decomposing $H_2SO_4$ to an equilibrium product distribution of $H_2O$, $SO_2$ and $O_2$ at 1120° K. after a residence time of less than about 0.5 sec.

EXAMPLE IV

Approximately 30 grams of $ZrO_2$ support material having a particle size of ⅛ in. (3.2 mm.) is immersed in 70 milliliters of an aqueous saturated solution of $CuSO_4$. The mixture is heated to boiling and then cooled to room temperature. The catalyst-carrying zirconia particles are drained and then dried for 30 minutes at 105° C. The supported catalyst is then calcined by heating to about 600° C. for about 8 hours. At this temperature, copper sulfate decomposes to CuO, and measurement shows that approximately 10 weight percent of copper oxide is present, based upon the weight of the $ZrO_2$ substrate. Testing of the catalyst in the presence of sulfuric acid vapors at a temperature between 1110° and about 1150° K. shows that it exhibits catalytic activity about the same as that produced in Example III. At a temperature of about 1110° K., it is effective in decomposing $H_2SO_4$ to an equilibrium product distribution of $H_2O$, $SO_2$ and $O_2$ after a residence time of less than about 0.3 sec.

EXAMPLE V

About 30 grams of zirconia are added to 70 milliliters of a saturated aqueous solution of $Fe_2(SO_4)_3$. The mixture is stirred while being brought to a boil and then allowed to cool to room temperature. After excess ferric sulfate is decanted, $Fe(OH)_3$ is precipitated by treating with concentrated ammonium hydroxide. Firing at about 600° C. for eight hours calcines the ferric hydroxide to ferric oxide. Examination shows that the loaded catalyst contains about 10 weight percent ferric oxide based upon weight of zirconia.

Testing shows that the catalyst exhibits exellent activity in decomposing sulfuric acid vapor between temperatures of about 1000° K. and 1150° K. At about 1050° K. an equilibrium product distribution is achieved after a residence time of about 0.4 sec. There appears no significant decrease in its activity with time.

EXAMPLE VI

Forty grams of $Ba(OH)_2.8H_2O$ is dissolved in about 70 milliliters of hot water. A ferric sulfate solution is prepared by dissolving ten grams of ferric sulfate in 15 milliliters of water which contains 5 ml. of concentrated sulfuric acid. Mixing of the two solutions creates a thick, brown coprecipitate of ferric hydroxide and barium sulfate. After centrifuging to remove excess water, the paste is extruded and dried at 105° C. for one-half hour. After breaking the dried, extruded material to create particles having a size no larger than about 5 mm., calcining is carried out at about 600° C. for about eight hours. Examination shows that the catalyst contains about 10 weight percent ferric oxide, based upon the weight of the barium sulfate.

Testing shows that the supported catalyst exhibits catalytic activity in decomposing sulfuric acid vapor between the temperatures of 1000° K. and about 1150° K. about the same as that produced in Example IV. At about 1060° K., an equilibrium product distribution is achieved after a residence time of about 0.4 sec. Catalytic activity remains substantially constant with time at a given temperature, and the supported catalyst has very good longevity.

Although the invention has been described with regard to certain preferred embodiments, it should be understood that changes and modifications as would be obvious to one having the ordinary skill in the art may be made without departing from the scope of the invention which is defined solely in the appended claims. Various of the features of the invention are set forth in the claims which follow.

What is claimed is:

1. A multi-stage process for the catalytic decomposition of $H_2SO_4$ using different catalysts in each stage which process comprises contacting $H_2SO_4$ in vapor form in a first stage reactor having a temperature gradient of at least about 100° K. with a platinum group metal catalyst at a temperature in the range between about 700° K. and 970° K. while heating said vapor to increase its temperature between about 100° K. and about 270° K., which platinum group metal catalyst is supported on a substrate selected from the group consisting of titania, or a mixture of barium sulfate, with about 2-30 weight percent titania to decompose at least about 40 percent of said $H_2SO_4$ to $SO_2$ under conditions approximating equilibrium conversion throughout said first stage reactor, and contacting said vapors from said first stage with a catalyst selected from the group consisting of copper oxide and iron oxide in a later stage reactor above about 970° K. while further raising the temperature of said vapor and decomposing said vapor under conditions approximating equilibrium conversion throughout said later stage reactor, said residence time of exposure to said catalysts in said first and second stages totalling not more than about 7 seconds and said decomposition approximating equilibrium conversion throughout said stages and the total decomposition equaling at least about 95% of equilibrium value at the exit temperature from said second stage.

2. A process in accordance with claim 1 wherein said first stage catalyst is platinum supported on a substrate of titanium oxide.

3. A process in accordance with claim 1 wherein said first stage catalyst is supported on a substrate of a mixture of $BaSO_4$ with about 2 and about 30 weight percent titania, based upon total weight of substrate.

4. A process in accordance with claim 1 wherein said later stage catalyst is supported on a substrate selected from the group consisting of barium sulfate, zirconium oxide and titanium oxide.

5. A process in accordance with claim 1 wherein said $H_2SO_4$ vapor flows continuously through said stages and decomposition of at least about 85 percent of said $H_2SO_4$ to $SO_2$ takes place.

6. A process in accordance with claim 5 wherein said decomposition is carried out sequentially in two beds having an overall temperature gradient of at least about 300° K.

7. A process in accordance with claim 5 wherein said later stage catalyst is $Fe_2O_3$ supported on $BaSO_4$.

8. A process in accordance with claim 5 wherein said later stage catalyst is CuO supported on zirconia.

9. A process for the relatively low temperature catalytic decomposition of $H_2SO_4$ to $SO_3$, $H_2O$, $SO_2$ and $O_2$, which process comprises contacting $H_2SO_4$ in vapor form with a platinum catalyst disposed in a reactor bed at an elevated temperature wherein the improvement comprises heating said vapor to increase its temperature between about 100° K. and about 270° K. in the range of between about 700° K. and 970° K. in contact with the platinum catalyst supported on a substrate titania or of a mixture of barium sulfate with about 2-30 weight percent titania while while approaching equilibrium conversion along the temperature gradient and effecting a total conversion of $H_2SO_4$ to $SO_2$ in an amount equal to at least about 95% of equilibrium value and also equal to at least about 40% of said $H_2SO_4$, said heating in contact with said catalyst taking place during a reactor residence time of not longer than 5 seconds.

10. A process in accordance with claim 1 wherein said substrate is titania.

11. A process in accordance with claim 1 wherein said substrate is a mixture of $BaSO_4$ with 2-30 weight percent titania.

* * * * *